(12) United States Patent
Oettinger (10) Patent No.: US 10,197,367 B1
(45) Date of Patent: Feb. 5, 2019

(54) METHOD OF MACHINING V-NOTCH GROOVES FOR CONTROLLED FRAGMENTATION OF WARHEADS

(71) Applicant: Wayne Michael Oettinger, Chattanooga, TN (US)

(72) Inventor: Wayne Michael Oettinger, Chattanooga, TN (US)

(73) Assignee: Precision Machining Services, Inc., Chattanooga, TN (US)

( * ) Notice: Subject to any disclaimer, the term of this patent is extended or adjusted under 35 U.S.C. 154(b) by 73 days.

(21) Appl. No.: 15/590,473

(22) Filed: May 9, 2017

Related U.S. Application Data (60) Provisional application No. 62/333,393, filed on May 19, 2016.

(51) Int. Cl.
| | | |
|---|---|---|
| *F42B 12/24* | (2006.01) | |
| *B23C 3/32* | (2006.01) | |
| *F42B 33/00* | (2006.01) | |
| *B23C 3/04* | (2006.01) | |
| *F42B 33/10* | (2006.01) | |
| *B23C 3/28* | (2006.01) | |
| *B23B 3/06* | (2006.01) | |

(52) U.S. Cl.
CPC .............. *F42B 12/24* (2013.01); *B23C 3/32* (2013.01); *F42B 33/00* (2013.01); *B23B 3/065* (2013.01); *B23B 2215/10* (2013.01); *B23C 3/04* (2013.01); *B23C 3/28* (2013.01); *B23C 2220/363* (2013.01); *F42B 33/10* (2013.01); *Y10T 29/5114* (2015.01); *Y10T 409/300112* (2015.01); *Y10T 409/305656* (2015.01)

(58) Field of Classification Search
CPC . Y10T 409/300112; Y10T 409/305656; Y10T 29/5109; Y10T 29/5114; Y10T 29/49995; B23P 13/00; B23P 13/02; F42B 33/10; B23C 2220/363; B23C 3/02; B23C 3/04; B23C 3/28; B23C 3/34; B23B 3/065; B23B 3/06; B23B 3/22; B23B 2215/10; B23B 3/24; B23B 3/26
See application file for complete search history.

(56) References Cited

U.S. PATENT DOCUMENTS

| | | | | |
|---|---|---|---|---|
| 1,140,130 | A * | 5/1915 | Dies ........................ | B23G 5/18 |
| | | | | 407/24 |
| 2,372,913 | A * | 4/1945 | Schmidt ................... | B23C 3/30 |
| | | | | 409/143 |
| 3,566,794 | A * | 3/1971 | Pearson .................. | F42B 12/22 |
| | | | | 102/493 |

(Continued)

FOREIGN PATENT DOCUMENTS

| | | | | |
|---|---|---|---|---|
| DE | 3014304 | A1 * | 10/1981 | ............... B23B 3/06 |
| DE | 4122460 | C1 * | 4/1992 | ............... B23F 5/163 |

*Primary Examiner* — Daniel Howell
*Assistant Examiner* — Yasir Diab
(74) *Attorney, Agent, or Firm* — Stephen J. Stark; Miller & Martin PLLC (57) ABSTRACT

An improved method of machines grooves forming Pearson notches in a pattern on hollow shell casings for munitions for at least one of increased functionality and/or performance. Rather than running a broach through a hollow casing, a CNC lathe with a multi-axis tool with cutting implement can precisely locate and form grooves along either an interior or an exterior surface of a hollow shell casing.

20 Claims, 6 Drawing Sheets

(56) References Cited

U.S. PATENT DOCUMENTS

| | | | | |
|---|---|---|---|---|
| 4,028,992 A * | 6/1977 | Kuehnle | ............ | B23C 3/32 |
| | | | | 409/132 |
| 4,068,590 A * | 1/1978 | Pearson | ............ | F42B 12/24 |
| | | | | 102/493 |
| 4,557,644 A * | 12/1985 | Scepanovic | ............ | B23C 3/30 |
| | | | | 409/143 |
| 4,860,453 A * | 8/1989 | Carroll | ............ | F42B 33/10 |
| | | | | 30/347 |
| 5,040,464 A * | 8/1991 | Pearson | ............ | F42B 12/24 |
| | | | | 102/493 |
| 5,076,744 A * | 12/1991 | Kitagawa | ............ | B23G 1/34 |
| | | | | 409/66 |
| 5,098,232 A * | 3/1992 | Benson | ............ | B23B 27/007 |
| | | | | 407/24 |
| 5,741,111 A * | 4/1998 | Goostrey | ............ | B23Q 1/5456 |
| | | | | 269/126 |
| 5,779,406 A * | 7/1998 | Astor | ............ | B23C 3/34 |
| | | | | 29/888.02 |
| 6,460,435 B1 * | 10/2002 | Meyer | ............ | B23G 1/32 |
| | | | | 409/66 |
| 9,463,519 B2 * | 10/2016 | Zeller | ............ | B23Q 1/4819 |
| 2001/0020406 A1 * | 9/2001 | Schmitt | ............ | B23G 5/182 |
| | | | | 82/1.11 |
| 2002/0000028 A1 * | 1/2002 | Jamison | ............ | B21D 51/54 |
| | | | | 86/19.5 |
| 2002/0071732 A1 * | 6/2002 | Funaki | ............ | B23C 3/26 |
| | | | | 409/132 |
| 2002/0183887 A1 * | 12/2002 | Nishimoto | ............ | B23G 1/38 |
| | | | | 700/159 |
| 2003/0010201 A1 * | 1/2003 | Takahashi | ............ | C23C 4/02 |
| | | | | 92/169.1 |
| 2005/0044707 A1 * | 3/2005 | Izquierdo | ............ | C23C 4/02 |
| | | | | 29/888.061 |
| 2006/0063021 A1 * | 3/2006 | Sekikawa | ............ | B23P 9/02 |
| | | | | 428/577 |
| 2008/0244891 A1 * | 10/2008 | Iizumi | ............ | B23B 27/007 |
| | | | | 29/527.4 |
| 2010/0209204 A1 * | 8/2010 | Wissling | ............ | B23G 7/00 |
| | | | | 408/1 R |
| 2010/0326270 A1 * | 12/2010 | Doerfler | ............ | B23P 9/00 |
| | | | | 92/169.1 |
| 2014/0004255 A1 * | 1/2014 | Whitbeck | ............ | B05D 1/02 |
| | | | | 427/8 |
| 2015/0224616 A1 * | 8/2015 | Miquel | ............ | B23C 1/12 |
| | | | | 409/131 |

* cited by examiner

METHOD OF MACHINING V-NOTCH GROOVES FOR CONTROLLED FRAGMENTATION OF WARHEADS

CLAIM OF PRIORITY

The present invention claims the benefit of U.S. Provisional Patent Application No. 62/333,393 filed May 9, 2016, which is incorporated herein by reference in its entirety.

FIELD OF THE INVENTION

The present invention relates to a method of cutting V-notch grooves and notches (Pearson) into armament bodies to produce stress points for fracture initiation in warheads.

BACKGROUND OF THE INVENTION

John Pearson and his team at China Lake developed technology between the 1940s through the 1970s related to the Pearson Notch, also referred to as a V-notch in which a series of grooves (whether intersecting or not) creates stress raisers and points of fracture initiation within armament bodies, for example, warheads, so that upon detonation of the warhead, the bodies would fragment into multiple smaller projectiles directed in accordance with an engineered plan.

While the engineering aspects of the technology were explored in those 30 years, manufacturing of these warheads by manufacturers has not proven to be as easy over the last sixty years as was initially contemplated.

Specifically, in the 1970s and 1980s fragmenting warheads became more and more popular. Explosives containing RDX or HMX were utilized. The two most popular size control methods employed for fragment size were the use of the Pearson Notch and the opposed notch techniques. Both of these methods provided for the use of solid steel casings. The residual strength after notching could still support the missile flight loads, if required, while still allowing for case expansion before eruption to obtain high fragment velocity.

Figure 1:
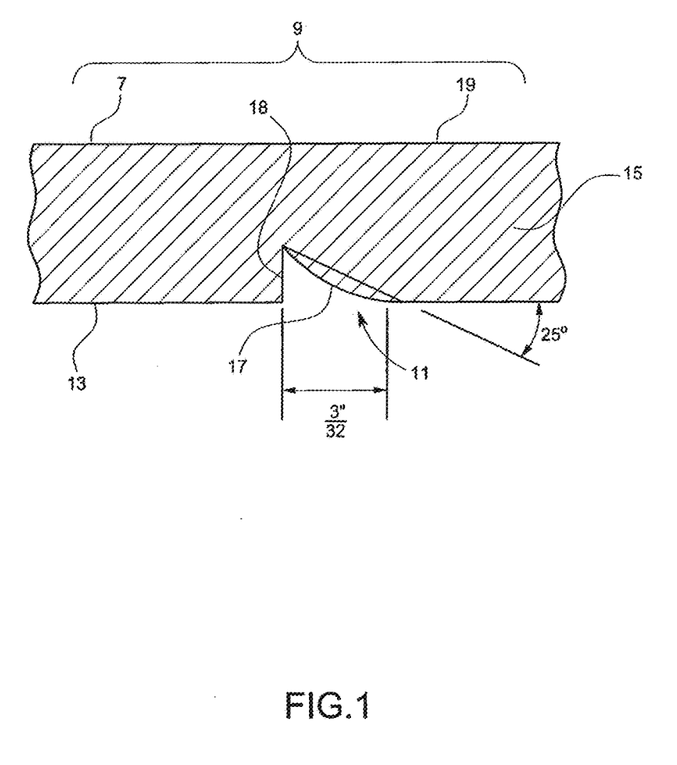
FIG. 1 is a cross sectional view of a groove as cut with a prior art broach.

To provide a Pearson Notch, the inside of the steel cylindrical case is notched in a diamond pattern as illustrated in FIG. 1 (cross section) with a branch to provide a diamond pattern. Even though the notches are typically shallow relative to the thickness of the cylindrical case, they have been found to be effective in initiating a fracture trajectory which travels the outside of the case as the case begins to expand upon detonation of the core explosive in the case. This method has been found to be effective for certain ratios of case thickness and notch spacing. For optimum ratios, it is estimated that 80% of the case mass can be controlled to a desired fragment size. While this is acceptable for some customers, the applicant has discovered that 80% is not satisfactory for many customers.

In order to manufacture these diamond shaped patterns, a broach operation is typically performed in which a broach (which is basically a plug with ascending elevations of teeth arranged in a helical pattern) is pulled by a broaching machine through an inner diameter of a warhead casing with the broach beginning at a first diameter with smaller cutting teeth which proceed in a helical manner to larger size teeth to cut more and more of the internal surface away from the inner surface of the material. The plug (or broach) is pulled through in a first direction which cuts parallel helical grooves. The broach is then reversed in direction, and pulled back through to provide opposing grooves to provide a diamond pattern.

Applicant tried this method of manufacturing with a broach. In the first try, the broach stuck internal to the casing. In the second try, internal bolts of the broach broke and a $150,000 broach was destroyed in the process of attempting to manufacture the warhead casing in accordance with the methodology principally used by Pearson and competitors of this technology for the past 50+ years.

As noted in U.S. Pat. No. 2,948,821, which describes that the attempts made in 1955: "have not been entirely satisfactory and the complete fragmentation control is not exercised and that the formation of such grooves or notches involves added difficulty and expense in fabrication of such bodies."

In fact, manufacturers have continued to struggle with the precise location and construction of these grooves for over fifty years with the broach technique. One warhead manufacturer has had a specialist work on providing more precise location and machining of the grooves for the past twenty years and still has not come up with a more effective technique than utilizing the broach.

In addition to Pearson grooves, there is an opposed groove method currently in use. The opposed groove method provides for providing narrow tapered or straight grooves cut on the inside and outside of the case directly opposite one another. These grooves are typically cut to a depth of the radius at the bottom of the groove chosen so that the thickness remaining between the grooves provides a required case strength and rigidity while also assuring that the case will break cleanly between opposing grooves upon explosive detonation. The opposed groove technique allows for a wider choice of fragment size, but the case can be weaker compared to the Pearson Notch technique. The opposed groove technique has been found to yield over 90% or more of the case fragmentation into the desired size fragment size as advised by prior art publications.

Additionally, sleeves can be utilized to effectively achieve a similar result by providing one set of parallel helix grooves cut in one direction and another set of parallel helix grooves cut in an opposing direction on inner diameters (i.e., a first set of grooves in an inner sleeve placed within an armament casing having a second set of grooves). Once again, these techniques typically do not yield fragments of the desired size of more than 90%. These limitations appear to the applicant to be directly related to imprecision in an ability to precisely cut the grooves during manufacturing by using the broach.

A broach is typically a plug that is pulled linearly through the bore of the casing and, due to the helical nature of the teeth, twist during the pulling operation to cut the desired helical patterns. There is virtually no control over the twist of the broach as it is pulled. The broach performs its own machining operation due to the angular nature of the helical pattern as it twists through the linear pulling operation. Grooves or notches cut with broaches tend to have rounded edges on the bottom surface (and are not normally provided at sharp angles as would normally be desired by the Pearson Notch technology (or opposed notch technology)). A prior art cross section of notch is shown in FIG. 1 as it is practically done using a broach in many instances. In comparing FIG. 1 to other figures as is performed by the applicant's technology, one will quickly see that sloppiness of manufacturing is believed to contribute to a lack of precision in obtaining a higher percentage of fragmentation than has been achieved with the prior art.

Accordingly, there is a need to more precisely and accurately cut grooves whether providing an opposed groove method on a warhead casing or a Pearson Notch method on a warhead casing and/or using an improved technique.

SUMMARY OF THE INVENTION

Accordingly, it is an object of many embodiments of the present invention to provide an improved method of machining notches or grooves internal and/or external to an armament casing or shell such as a warhead.

It is another object of many embodiments of the present invention to provide an improved method of precisely cutting helical grooves (whether parallel and/or intersecting) internal and/or external to a casing such as a cylindrically shaped or other shaped casing for use in providing one of opposed groove method or Pearson Notch method fragmentation control techniques.

Accordingly, in accordance with the presently preferred embodiment of the present invention, the applicant utilizes a CNC lathe coupled to a tool as manufactured by the applicant and software so that the lathe and the tool coordinate to precisely cut helical grooves into the armament casing for fracture control.

Specifically, the contact of the shape of a carbide tip of the tool is precisely controlled and provided and then placed in contact with the surface of the armament casing in a coordinated manner to coordinate with the turning of the casing by the lathe along with the then linear movement of the tool while with the turning of the casing so that precise cuts can be made into the armament casing. The computerized nature of the process can be made so that the tool cuts to an extremely precise depth into the armament casing in the desired location as can be tracked with the software relative to the casing through its movement.

After completing one of the twists such as the right hand or the left hand cuts, a separate tool or even the same tool can be adjusted, if necessary, to then make the left hand cuts. It may be possible for further embodiments to alternate between left hand and right hand cuts, and it may be that the complete depth of each of the cuts is not made before beginning any of the other cuts for at least some embodiments.

The applicant has discovered that utilizing a modern machine shop scanning system, the applicant has achieved an extremely high accuracy for the placement of the grooves in accordance with the specifications which far exceeds the precision as has been achieved by the applicant's customers with broaching technology. Particulate reaching desired fragment size is estimated to be at least, if not greater than, 95% with appropriate explosives to far exceed the prior art capabilities as achieved by the relatively poor accuracy of broach technology.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

FIG. 1 shows a prior art Pearson Notch in a cross sectional view. As a practical matter, one of the angles typically does not have a sharp plane or a wall 18 but instead has a curved surface 17 as is a direct result of the sloppiness of pulling a broach through the inner diameter 13 as would be understood that diameter 13 is typically a circular or cylindrically shaped wall. Additionally, because the broach is pulled through this inner surface 13, very little control is maintained during the machining operation as the plug cuts each of the notches 11 by pulling the broach linearly through the inner wall 13 while the outer wall is held in a fixed position by a clamping member 9 as would be understood by those of ordinary skill in the art to outer wall 7.

With all the Pearson Notch technologies developed by John Pearson in the 1940s through 1970s, the broaching process resulted in the curved surfaces 17 which could lead to the lack of precision in forming the fragments at 80% or less or even in the angularly relationship such as the 25 degree angle shown in FIG. 1, still less than 90% fragmentation is typical.

Figure 2:
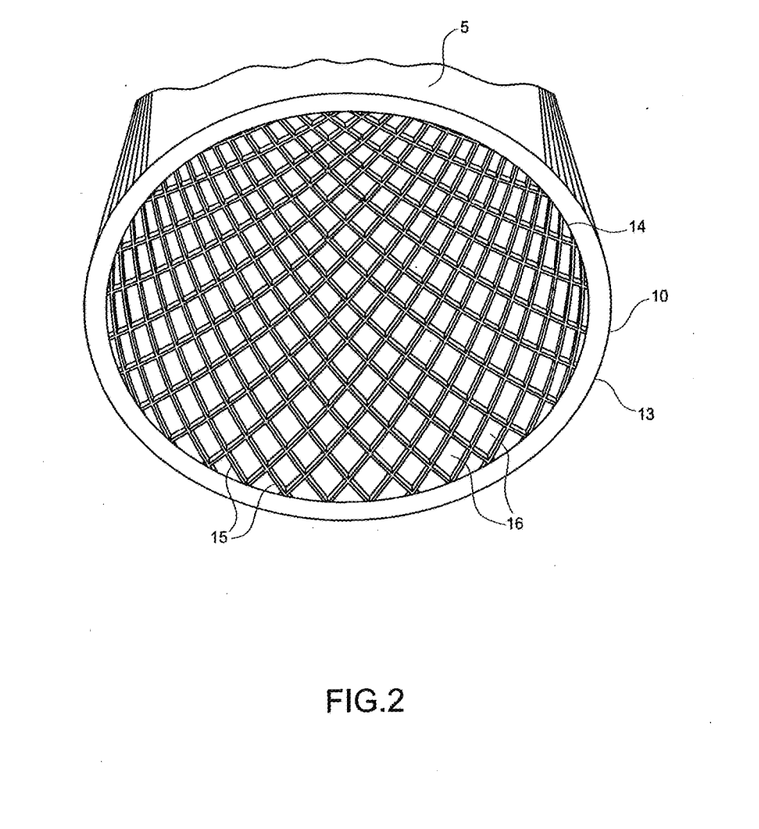
FIG. 2 is an in-view of a cylinder showing a groove pattern cut in accordance with the presently preferred embodiment of the present invention.

The applicant can make the notches 15 shown in FIG. 2 and the interior wall 14 of the armament shell 10 such as a warhead (and also in the exterior surface 13 for some embodiments such as opposed groove technology) so that individual portions 16 can break apart as fractions preferably in an increased efficiency rate such as even over 95% for some embodiments by more accurately cutting the angles than has been done with broaching technology. Representative groove 5 is shown on the exterior surface 13 such as could be done for opposed groove technology as would be understood by those of ordinary skill in the art which could have the same cross-section such as shown in FIG. 3 or others.

Figure 3:
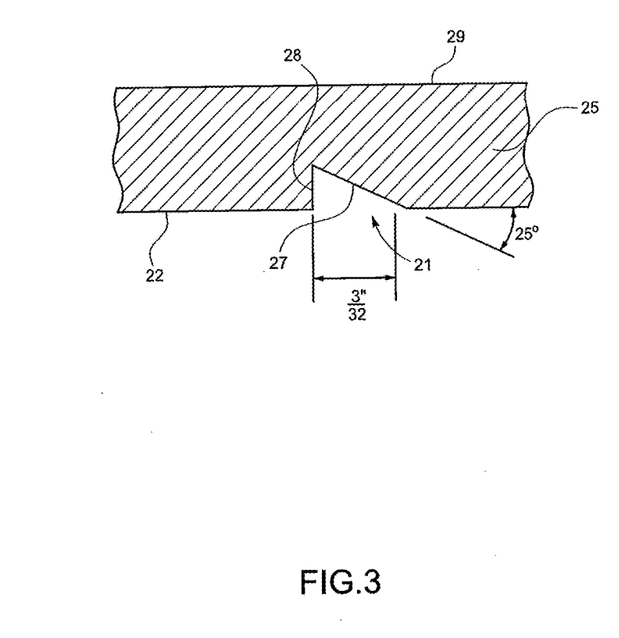
FIG. 3 is a cross-sectional view showing a clean cut as compared to FIG. 1 utilized by the presently preferred embodiment of the present invention.

FIG. 3 shows Precision using the applicant's method of manufacturing a fragmentation control pattern in armament shells which will be described in further detail. Namely, the shell 25 such as a hollow shell casing can have a first wall 28 cut relative to a second wall 27 in a precise angled relationship with the walls 28,27 being planar to form a groove 21. In other embodiments, the walls can be purposely machined preferably with a rotating cutting tool or implement to have other configurations other than planar utilizing the technology as described herein. Accordingly, a whole new set of internal geometries other than an attempted parallel matching grooves can be provided (while of course, the applicant's first assignment is to make the parallel matching grooves in a diamond fashion for one particular missile construction) which can also be done. Just like the groove 21 as shown on the entry wall 22 of a shell 25, the exterior surface or wall 29 could also be provided with a similar groove or alternatively, as seen in FIG. 3, the interior surface or wall 22 (i.e., a bore 122) could actually be an exterior wall depending on which direction one looks at the structure and how it is cut to provide a pattern of grooves of Pearson Notches.

FIGS. 3-10 show the applicant's technology which heretofore is not believed to have been utilized to create the Pearson Notches.

Figure 4:
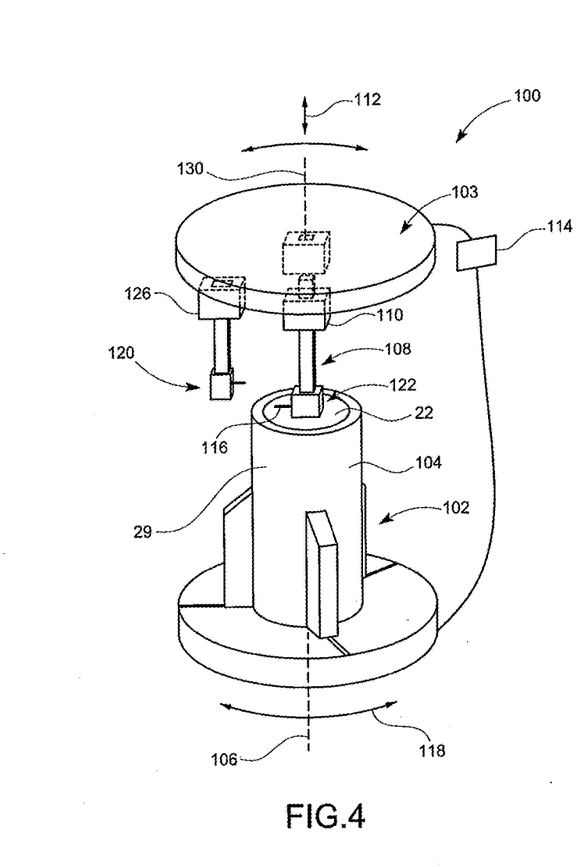
FIG. 4 shows a perspective view of the tool in combination with the armament case and lathe of a computer controlled lathe with a tool as used with the presently preferred embodiment of the present invention with the computerized element shown in diagrammatic form.

Specifically, the applicant provides a computer controlled machine (CNC0 such as a lathe 100 which can have a fixture 102 to hold an armament shell 104 as illustrated or otherwise so that the shell 104 rotates about an axis 106. Simultaneously, a first tool 108 can be moved by driver 110 in a linear fashion from the armament shell 104 on axis 112 which can be perpendicular to axis rotation 106. Computer 114 can precisely locate the cutting head 116 in contact with the armament shell whether it be the inner diameter 22 or the outer surface 29.

As the fixture 102 of the lathe 100 rotates, either clockwise or counterclockwise shown by rotation curve 118, the tool head 116 can be selectively placed in contact to start making, if not make, the grooves such as groove 21. Fixture 103 may rotate as well during this step or not. Computer 114 can precisely locate the cutting head 116 into the desired position to make the pattern of grooves, such as first groove, second groove, etc., such as the pattern shown in FIG. 2 or others. As can be seen by FIG. 4, with the first tool 108 can make the right angled cuts while the second tool 120 could be switched by driver 110 to then make the left handed cuts. Accordingly, the right hand or left hand cuts could then be made in desired positions to provide the diamond pattern shown in FIG. 2 or other pattern of grooves forming Pearson Notches. It would be understood by those of ordinary skill in the art that the direction of rotation 118 can be changed from clockwise to counterclockwise depending on which of the first and second cutting tools 108,120 are employed to make the desired angular cuts for at least some embodiments. Alternatively, tool head 116 could rotate or otherwise be movable relative to tool 108 for at least some embodiments.

The applicant has been working with one manufacturer of missiles that has been making missiles for over 50 years who has always relied on the broaching method and is extremely impressed with the accuracy of the walls 27,28 that the applicant is able to achieve with this methodology for which that manufacturer has been trying for almost 50 years to achieve.

The computer 114 can assist in precisely locating the cutting head 116 in contact with the inner and outer surfaces 22,29 as desired and can also select which of the various tools 108,120 etc., are placed in contact to make the desired cuts. With the software of the computer 114, the exact placements can be provided as desired and the specified shapes do a significantly higher tolerance than has been achieved with prior art methods with broaches.

Figure 5:
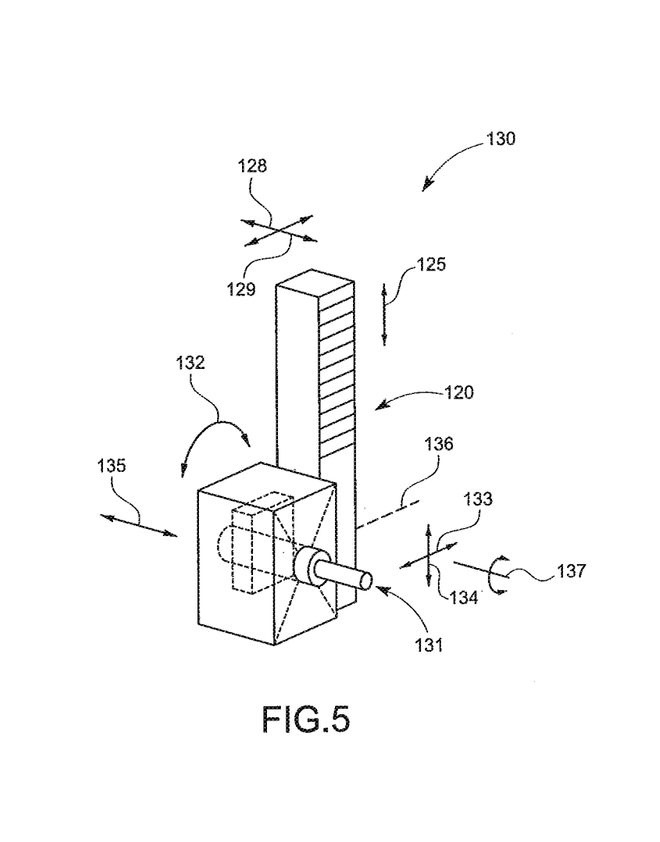
FIG. 5 is a perspective view of the tool shown in FIG. 4.

The tool heads such as 108 and 120 can be seen in further detail in FIG. 5 which shows a detail of one embodiment of tool head 120. Tool head 120 can move linearly along axis 125 such as with a driver 126 or otherwise. Tool head 120 may also be linearly movable radially along axis 128 and even be rotated along rotation curve 129 about rotation axis 130. Meanwhile the cutting implement 131 of the cutting tool 132 may be movable relative to the tool head 120 such as in along x-y axes 133,134, in and out along axis 135 or even rotationally about axis 136 relative to the tool 120 or otherwise. Such a construction, particularly when coupled to the computer 114 can provide for precise placement of the cutting implement relative to the housing 104 (whether an interior surface 22 or exterior surface 29) to provide detail and capabilities not previously available to the Pearson notch technology. Many cutting heads or implements 131 rotate about axis 137 to provide cuts as is known in the art.

Figures 6, 7:
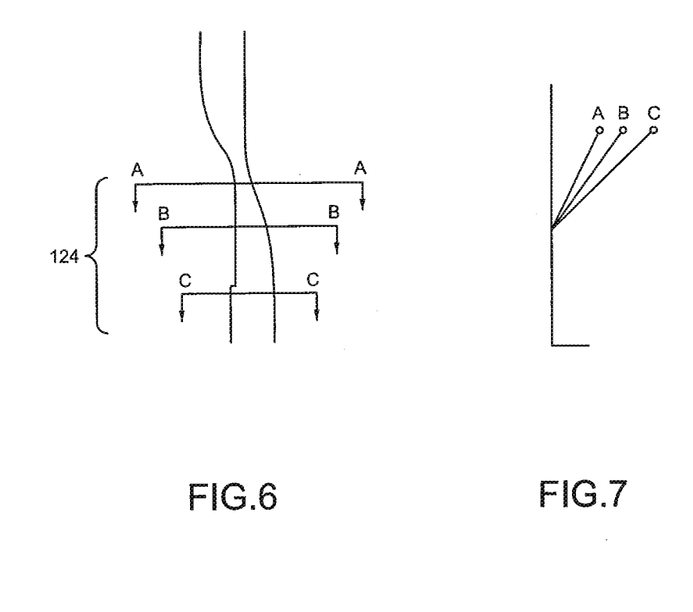
FIG. 6 is a top perspective view of a notch of an alternatively preferred embodiment.
FIG. 7 is a cross sectional view taken along the lines A-A, B-B and C-C of FIG. 6.

For instance, FIG. 6 shows an option in which by selecting the angular relationship and/or length of travel of the tools 108,120 with the cutting implements or heads 116 internal to the bore 122 and the use of different shaped cutting heads, the angular relationships as seen in FIGS. 6 and 7 can be provided where one could go from a relatively wide cut such as 60 degrees to 45 degrees to 30 degrees or any degree between roughly from about 80 degrees to about 5 degrees as would be understood by those of ordinary skill in the art and can vary along a length 124 such as a first length. It is anticipated that for many embodiments, a first angle A can change relative to a second angle B at least 5 degrees, 10 degrees or more. Such variance has not happened with any prior art V-notch to the applicant's knowledge. Specifically, section A is about 30 degrees, section B is about 45 degrees, and section C is about 60 degrees as it relates to an angle between planes or walls 27 and 28. Other angular relationships could be provided along other lengths 24 as well with other embodiments utilizing this technology. The direction of the angular relationship could also be reversed as is shown in FIG. 6.

Figure 8:
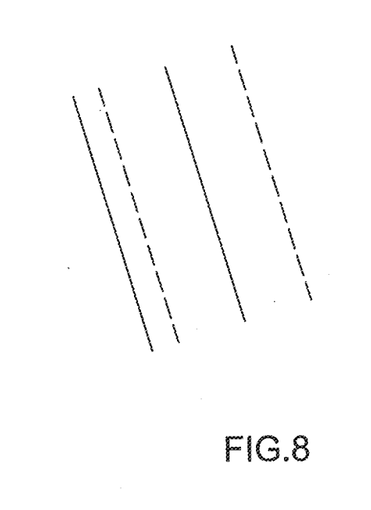
FIG. 8 is a top perspective view of an alternatively preferred view of adjacent notches.
Figure 9:
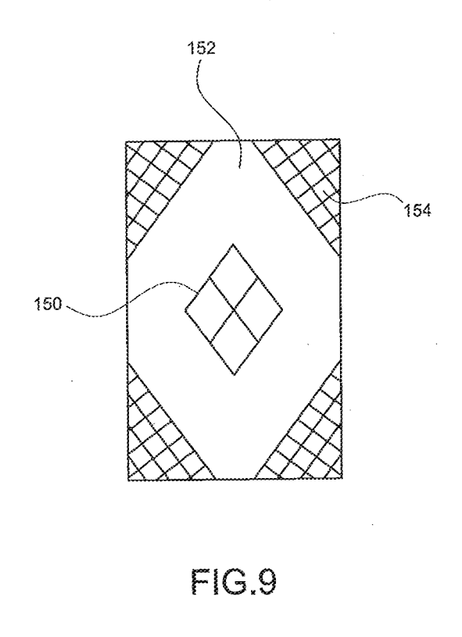
FIG. 9 is a plan view of a shell cut and made to view planar in accordance with the alternatively preferred embodiment of the present invention.

FIG. 8 shows the ability by utilizing separate tools 108, 120 even along the same direction of twist as having different angular relationships which can now be accomplished which in the prior art broaching technique to the applicant's knowledge has never been attempted.

Figure 10:
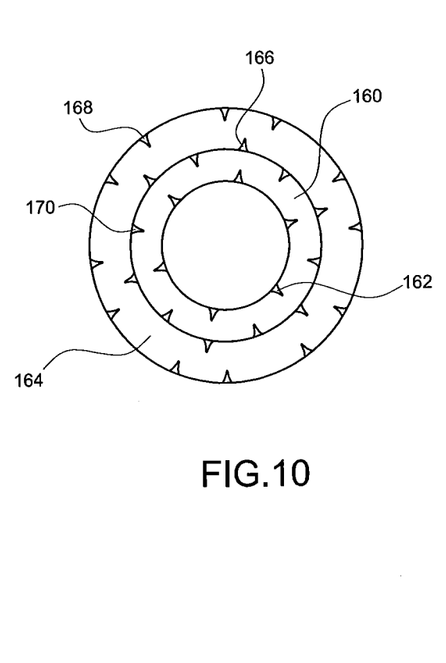
FIG. 10 is a cross sectional view of an alternatively preferred embodiment of the present invention.

Furthermore, FIG. 10 shows that by utilizing different tools and controlling the depth of the cuts into surface(s) 22 and/or 29, that non-continuous diamond patterns can be provided such as by providing a first fragment size 150 spaced by planar surface 152 from smaller fragment sizes 154. First groove 21 could terminate internal to a bore 122 as shown or otherwise, such as along a first length of a groove 21. Additionally, by providing the entirely new fragmentation patterns can be provided that have never been provided before such as an ability to downwardly direct larger fragment sizes for the potential ability to take out larger targets such as vehicles while still providing an anti-personnel aspect with the more laterally directed fragments such as 154 in a way never yet considered by engineers due to the lack of ability to manufacture as is shown and described herein. Still another feature for at least some embodiments is that an inner diameter of the bore 122 (and/or others) can change and still have grooves 21 cut to a desired depth from a front to a rear of the shell 104. Still other embodiment could have non-parallel grooves or groove segments corrected by speeding up or slowing down linear movement of tool and/or rotation of the shell. Still other embodiments may cut grooves of first and second locations along a length of the groove at differing depths (such as 10% longer or more), possibly in combination with other features taught herein.

While the principal focus and discussion has been shown to describe the internal surfaces 22, it would be understood that the exterior surface 29 can be machined in a similar manner as shown and described herein to provide grooves such as groove 5 shown in FIG. 2 and/or a series of grooves even intersecting grooves, etc., as would be understood by those of ordinary skill in the art. External diameters could vary along a length of the shell 104 as well for at least some embodiments.

Furthermore, as shown in FIG. 10, for at least some embodiments sleeves such as first sleeve 160 can be machined with grooves 162 while an outer sleeve 164 can be machined with grooves 166 on an inner surface as well as grooves 168 on an outer surface and grooves 170 and even provided on outer surface of inner sleeve 160 as would be understood by those of ordinary skill in the art to assist in providing with the various grooves 162,170,166,168 being provided in various ways as shown and described herein with the first sleeve 160 machined and then the second sleeve 164 machined and then the first sleeve placed within the second sleeve 164 as has been described throughout this application. Much more precise fragmentation can be achieved with technologies described herein than in prior art techniques. In fact, the applicant believes that at least 95% fragmentation can occur even using the pattern such as is shown in FIG. 2 on the inner surface which far exceeds the 90% fragmentation experienced with the prior art broaching technology.

Furthermore, there can also be embodiments having more traditional opposed grooves where the left wall is symmetrical to the right wall in the groove and instead of achieving 80% fragmentation the applicant has achieved at least 90% if not 95% upon detonation of an internal warhead due to the accuracy of the machining technology and the physics involved.

Figure 11:
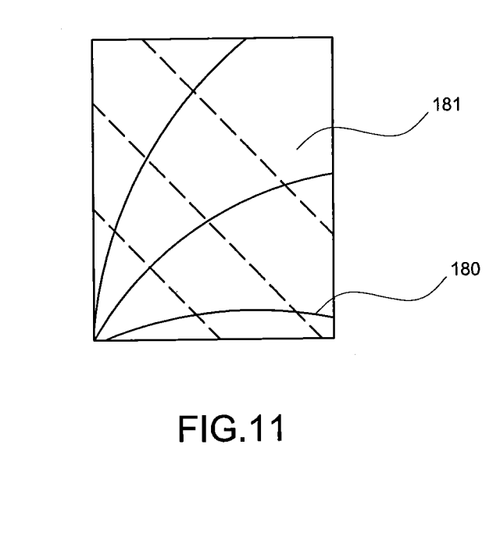
FIG. 11 is a plan view of an alternatively preferred embodiment of the present invention of a shell cut made to view planar.

FIG. 11 shows non parallel grooves 180,181 of an embodiment using the technology such as is shown in FIG. 4 and others. Still other embodiments may provide for yet additional patterns. (First groove 180 proceeds in a similar direction of rotation with second groove 181 about a hollow shell casing, but at least portions of the grooves 180,181 are not parallel for this embodiment.

Unlike use of broaches to cut grooves into casings, the applicant has a methodology which can vary a pattern of grooves along distances of the grooves including, but not limited to (a) angular relationship of planes 27,28 forming the walls of any of the groove(s) 21, (b) varying the depth of any of the groove(s) 21 (c) changing the pattern of grooves 21 in a continuous or discontinuous manner, and/or (d) providing non-parallel grooves 21.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of manufacturing a fragmentation control pattern in armament shells comprising the steps of:
    (a) rotating a hollow shell casing about an axis, while simultaneously
    (b) linearly moving a rotating cutting tool along a surface of the hollow shell casing thereby cutting at least first and second walls to provide a first groove as a portion of a pattern of Pearson Notches about the surface of the hollow shell casing; and whereby
    (c) upon detonation of a warhead within the hollow shell casing, at least 90% fragmentation is achieved.

2. The method of manufacturing of claim 1 wherein surface is an interior surface of the hollow shell casing.

3. The method of manufacturing of claim 1 wherein the surface is an exterior surface of a hollow shell casing.

4. The method of manufacturing of claim 1 wherein the angle between the first and second walls changes at least 10 degrees over a length of the first groove.

5. The method of manufacturing of claim 1 wherein a depth of the first groove changes over a length of the first groove.

6. The method of manufacturing of claim 5 wherein the first groove terminates internal to a bore of the hollow shell casing.

7. The method of manufacturing of claim 1 further comprising a second groove proceeding along a similar direction of rotation about the hollow shell casing with the first groove, and at least portions of the first and second groove are not parallel.

8. The method of manufacturing of claim 1 wherein the pattern of Pearson notches changes along a length of the hollow shell casing.

9. A method of manufacturing a fragmentation control pattern in armament shells comprising the steps of:
    (a) rotating a hollow shell casing about an axis with a CNC lathe while simultaneously
    (b) linearly moving a rotating cutting tool along a surface of the hollow shell casing thereby cutting at least first and second planes to provide a pattern of Pearson Notches about the surface of the hollow shell casing; wherein
    (c) a first length of a first groove forming a Pearson notch on a surface of the hollow shell casing has a first location with a first angle between first and second planes and a second location of the groove has a second angle between the first and second planes, wherein the first angle is at least five degrees larger than the second angle.

10. The method of manufacturing of claim 9 wherein the first angle and the second angle differ by at least 10 degrees.

11. The method of manufacturing of claim 9 wherein the first groove terminates at the surface along the first length.

12. The method of manufacturing of claim 9 wherein a pattern of groves having the first groove changes along a length of the hollow shell casing.

13. The method of manufacturing of claim 9 further comprising a second groove proceeding along a similar direction of rotation about the hollow shell casing with the first groove, and at least portions of the first and second groove are not parallel.

14. The method of manufacturing of claim 9 wherein a depth of the first groove changes over the first length of the first groove.

15. The method of manufacturing of claim 9 wherein upon detonation of a warhead within the hollow shell casing, at least 90% fragmentation is achieved.

16. A method of manufacturing a fragmentation control pattern in armament shells comprising the steps of:
    (a) rotating a hollow shell casing about an axis with a CNC lathe while simultaneously
    (b) linearly moving a rotating cutting tool along a surface of the hollow shell casing thereby cutting at least first and second planes to provide a pattern of Pearson Notches about the surface of the hollow shell casing; wherein (c) a first length of a first groove forming a Pearson notch on a surface of the hollow shell casing has a first location with a first depth and a second location with a second depth at least 10% longer than the first depth.

17. The method of manufacturing of claim 16 wherein upon detonation of a warhead within the hollow shell casing, at least 90% fragmentation is achieved.

18. The method of manufacturing of claim 16 wherein the first groove has a first location having a first angle between first and second planes and a second location of the first groove has a second angle between the first and second planes, wherein the first angle is at least five degrees larger than the second angle.

19. The method of manufacturing of claim 16 further comprising a second groove proceeding along a similar direction of rotation about the hollow shell casing with the first groove, and at least portions of the first and second groove are not parallel.

20. The method of manufacturing of claim 1 wherein the pattern of Pearson notches changes along a length of the hollow shell casing.

\* \* \* \* \*